(12) United States Patent
Zhang et al.

(10) Patent No.: US 11,641,165 B2
(45) Date of Patent: May 2, 2023

(54) FLYBACK CONVERTER AND METHOD OF OPERATING THE SAME

(71) Applicant: INNOSCIENCE (SUZHOU) TECHNOLOGY CO., LTD., Jiangsu (CN)

(72) Inventors: Tao Zhang, Suzhou (CN); Jihua Li, Suzhou (CN); Yulin Chen, Suzhou (CN)

(73) Assignee: INNOSCIENCE (SUZHOU) TECHNOLOGY CO., LTD., Jiangsu (CN)

( * ) Notice: Subject to any disclaimer, the term of this patent is extended or adjusted under 35 U.S.C. 154(b) by 269 days.

(21) Appl. No.: 17/053,757

(22) PCT Filed: Sep. 30, 2020

(86) PCT No.: PCT/CN2020/119398
§ 371 (c)(1),
(2) Date: Nov. 6, 2020

(87) PCT Pub. No.: WO2022/067663
PCT Pub. Date: Apr. 7, 2022

(65) Prior Publication Data
US 2022/0385197 A1    Dec. 1, 2022

(51) Int. Cl.
*H02M 3/335* (2006.01)
*H02M 1/00* (2006.01)

(52) U.S. Cl.
CPC ..... *H02M 3/33592* (2013.01); *H02M 1/0058* (2021.05)

(58) Field of Classification Search
CPC ........... H02M 3/33592; H02M 1/0058; H02M 3/33576; H02M 3/33507
See application file for complete search history.

(56) References Cited

U.S. PATENT DOCUMENTS

| | | | |
|---|---|---|---|
| 9,899,931 | B1 | 2/2018 | Chang et al. |
| 9,998,021 | B2 | 6/2018 | Chang |

(Continued)

FOREIGN PATENT DOCUMENTS

| | | |
|---|---|---|
| CN | 108155799 A | 6/2018 |
| CN | 110768515 A | 2/2020 |

(Continued)

OTHER PUBLICATIONS

International Search Report and Written Opinion of the corresponding PCT application No. PCT/CN2020/119398 dated Jun. 24, 2021.

(Continued)

*Primary Examiner* — Kyle J Moody
(74) *Attorney, Agent, or Firm* — McCoy Russell LLP

(57) ABSTRACT

The subject application provides a zero-voltage switching flyback converter comprising: a transformer having a primary winding and a secondary winding; a primary switch and a secondary switch for conducting the currents flowing in the primary winding and secondary winding respectively. A timing control method for operating the flyback converter are provided to accomplish zero-voltage switch by turning on the secondary switch twice within one switching power cycle.

16 Claims, 11 Drawing Sheets

(56) References Cited

U.S. PATENT DOCUMENTS

| 10,250,152 B2* | 4/2019 | Chang ..................... H02M 1/44 |
| 2018/0301975 A1 | 10/2018 | Lin et al. |
| 2018/0351465 A1 | 12/2018 | Cannenterre |
| 2020/0280263 A1* | 9/2020 | Lin ................... H02M 3/33592 |

FOREIGN PATENT DOCUMENTS

| CN | 107979288 B | 5/2020 |
| CN | 111628632 A | 9/2020 |

OTHER PUBLICATIONS

Quasi-Resonant Flyback Controller, High Frequency NCP1342 published by Semiconductor Components Industries, LLC in Jun. 2020.

* cited by examiner

FLYBACK CONVERTER AND METHOD OF OPERATING THE SAME

TECHNICAL FIELD

The subject application generally relates to a flyback converter, and more particularly to a zero-voltage switching flyback converter.

BACKGROUND

A flyback converter is commonly used in an electronic product, such as a charger, which generally requires electric isolation between an input end and an output end thereof. The operating principle of flyback converter is similar to a buck-boost converter, except an additional transformer is used to achieve isolation between the input and output.

SUMMARY

An object of the subject application is to provide a zero-voltage switching (ZVS) flyback converter realized with less components, more compact in size and improved efficiency compared to the above-said conventional flyback converters.

A further object of the subject application is to provide a flyback converter timing control method to achieve zero voltage switching with load-independent switching frequency such that undesirable electromagnetic interference due to variable switching frequency can be avoided.

The subject application provides a zero-voltage switching flyback converter comprising: a transformer having a primary winding and a secondary winding; a primary switch and a secondary switch for conducting the currents flowing in the primary winding and secondary winding respectively. A timing control method for operating the flyback converter is provided to accomplish zero-voltage switch by turning on the secondary switch twice within one switching power cycle.

According to one aspect of the subject application, a zero-crossing detection (ZCD) signal is generated by an auxiliary winding magnetically coupled with the primary winding and the secondary winding. The secondary switch is turned on for a second time within the power cycle in response to a rising edge of the ZCD signal occurring immediately after an event count reaches a corresponding count threshold.

According to another aspect of the subject application, a ZCD signal is generated based on a source-to-drain voltage of the secondary switch and the output voltage Vout provided by the secondary winding. The secondary switch is turned on, for a second time within the power cycle, in response to a falling edge of the ZCD signal occurring immediately after an event count reaches a corresponding count threshold.

BRIEF DESCRIPTION OF THE DRAWINGS

Preferred embodiments of the subject application are described in more detail hereinafter with reference to the drawings, in which.

DETAILED DESCRIPTION

In the following description, embodiments of flyback converters and timing control method for operating the same are set forth as preferred examples in accordance with the subject application. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

Figure 1:
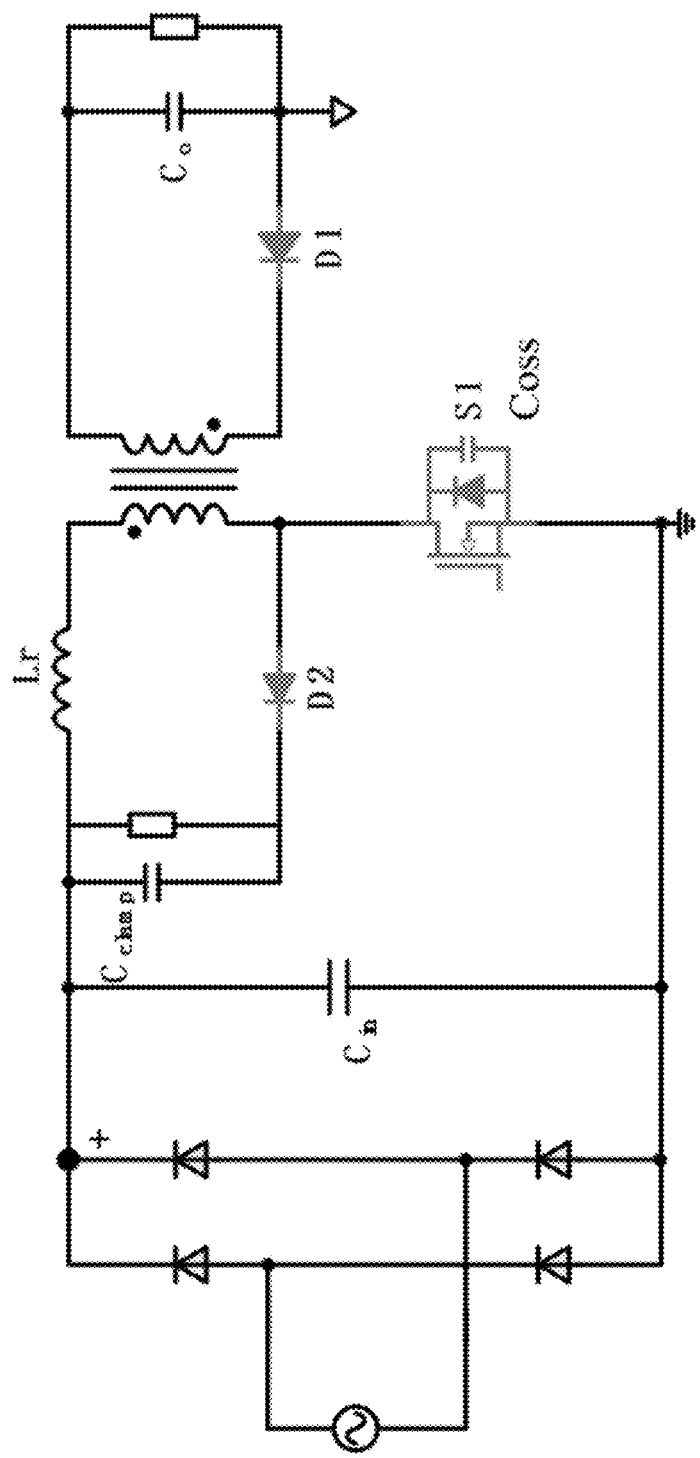
FIG. 1 shows a circuit schematic diagram of a flyback converter according to some embodiments of the subject application.

FIG. 1 shows a circuit schematic diagram of a flyback converter according to some embodiments of the subject application. In the flyback converter as shown in FIG. 1 (which can also be referred to as a quasi-resonant flyback converter), after the main switch S1 is turned off, the transformer transmits energy to the load. After the magnetizing inductance current reaches zero, the magnetizing inductance resonates with the junction capacitance of the switch S1. The switching loss of the converter can be minimized by resonant valley switching achieved by turning on S1 at half of resonance cycle when the voltage across S1 resonates from $V_{in}+nV_o$ to $V_{in}-nV_o$, where Vin is the input voltage, Vo is the output voltage, and n is the ratio of number of turns of the primary winding to number of turns of the secondary winding. However, as the switching voltage cannot be reduced to zero value, the converter may suffer from power loss and electromagnetic interference (EMI) issues as well as energy consumption due to inductance leakage through the RCD circuit branch.

Figure 2:
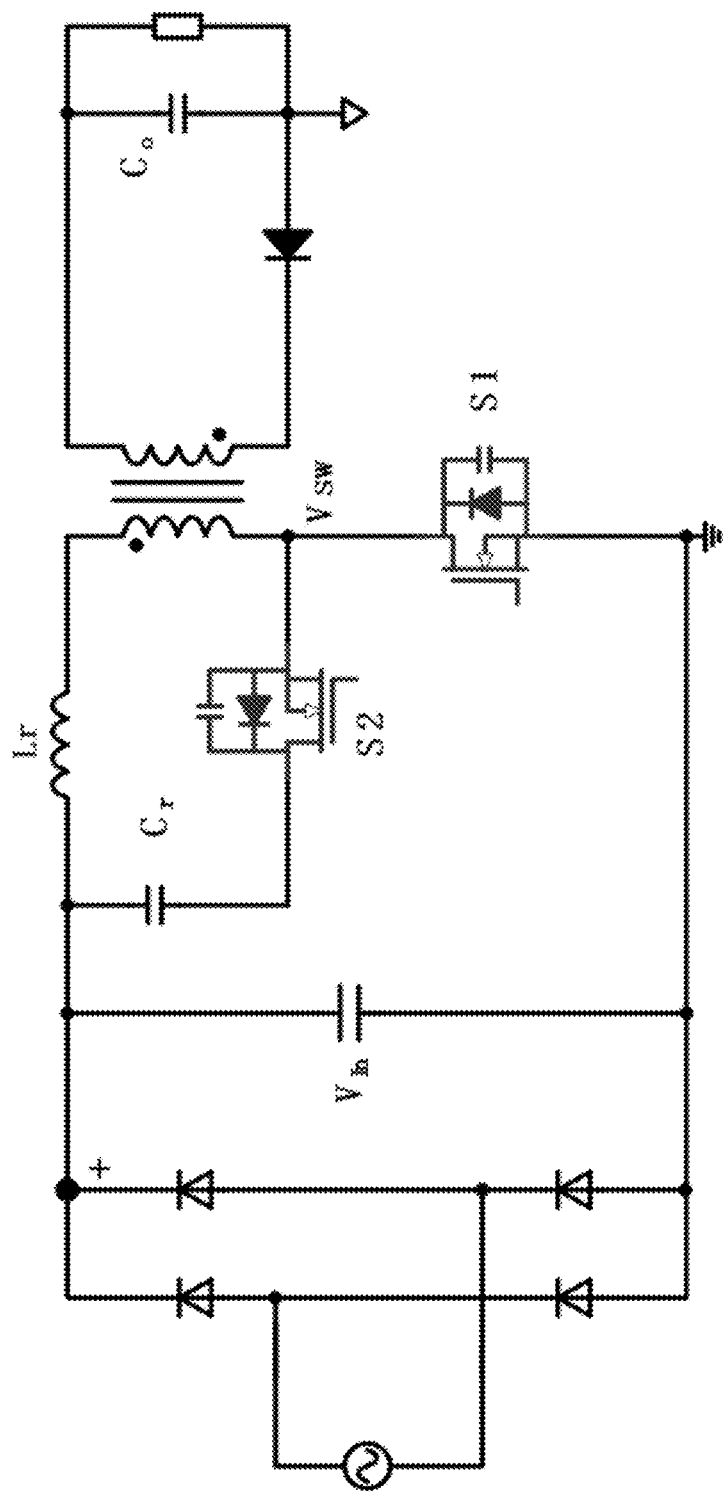
FIG. 2 shows a circuit schematic diagram of a flyback converter according to some embodiments of the subject application.

FIG. 2 shows a circuit schematic diagram of a flyback converter according to some embodiments of the subject application. In the flyback converter as shown in FIG. 2 (which can also be referred to as an actively clamped flyback converter), the main transistor switch S1 and the clamping transistor switch S2 are turned on in a complementary manner, which can include two working modes: Lr-Cr resonance mode and the Lr-Co resonance mode, where Lr is the leakage inductance of the transformer, Cr is the primary clamping capacitor, Co is the secondary output capacitance. After S1 is turned off and S2 is turned on, Lr resonates with Cr or Co, and the transformer transfers energy to the load. When the leakage inductance current resonates to be equal to the excitation inductance current, the secondary diode returns to the reverse direction. The primary current of the transformer continues to decrease and reverse under the action of the Cr capacitor voltage. After S2 is turned off, the leakage inductance Lr resonates with the Coss of the device S1, so that the voltage across S1 resonates to zero value. As a result, ZVS of the main switch S1 can be realized and EMI is small. The switching loss of this solution is smaller than that of the quasi-resonant flyback converter, and there is no RCD branch loss, but this solution requires one more high-voltage switching device than the quasi-resonant flyback converter, which will increase the cost and volume, and due to the increase in the effective value of the transformer input current, causing the loss of the transformer to increase, but the overall efficiency will be relatively great.

Figure 3:
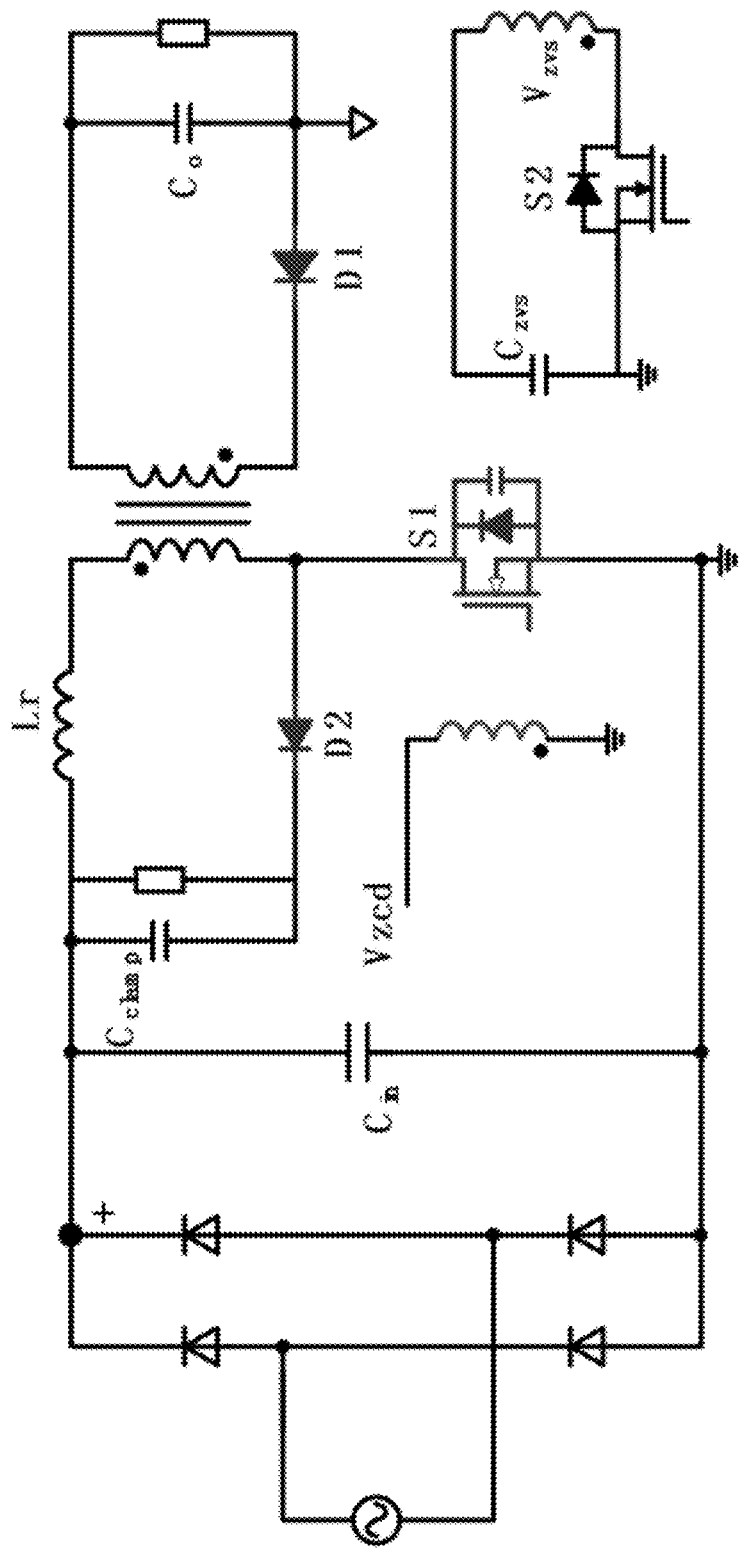
FIG. 3 shows a circuit schematic diagram of a flyback converter according to some embodiments of the subject application.

FIG. 3 shows a circuit schematic diagram of a flyback converter according to some embodiments of the subject application. In the flyback converter as shown in FIG. 3 (which can also be referred to as a forced frequency resonant flyback converter), an additional transformer auxiliary winding and a low-voltage switching device (S2) are added on the basis of the configuration of quasi-resonant flyback converter. Before S1 is turned on, S2 is turned on for a short time to allow the magnetizing inductance of the transformer to be negative. After the S2 is turned off finally, the reversed magnetization current is sufficient to draw the voltage of the main switch S1 to zero value so that ZVS of the main switch S1 can be realized and EMI is small. This solution can address non-zero voltage switching issues. Moreover, this solution can also avoid the relatively high cost and volume problems. However, the flyback converter as shown in FIG. 3 requires relatively great number of components, which includes, for example but is not limited to, a high-voltage switching transistor, a high-voltage diode, a low-voltage switching transistor, a low-voltage diode, and an auxiliary winding.

Timing control schemes have been implemented in flyback converters to accomplish ZVS so as to achieve high efficiencies. For example, a flyback converter is implemented with a forced zero voltage switching timing control scheme where the synchronous rectifier is turned on near the end of the switching cycle or the on-duration of a synchronous rectifier is extended to develop a current ripple on the secondary winding current such that the energy in the transformer resulted from the negative current values is used to drive the drain voltage of the primary switch down to zero voltage. However, power loss would still be caused if the synchronous rectifier is not switched at zero voltage. On the other hand, the on-duration extension approach may cause the switching frequency of the flyback converter to be variable as a function of the load, which is undesirable, especially when electromagnetic interference disturbance is critical.

In the subject application, flyback converter and a timing control method for operating the same are provided to achieve zero voltage switching on both primary and secondary sides such that power loss can be further diminished.

Figure 4:
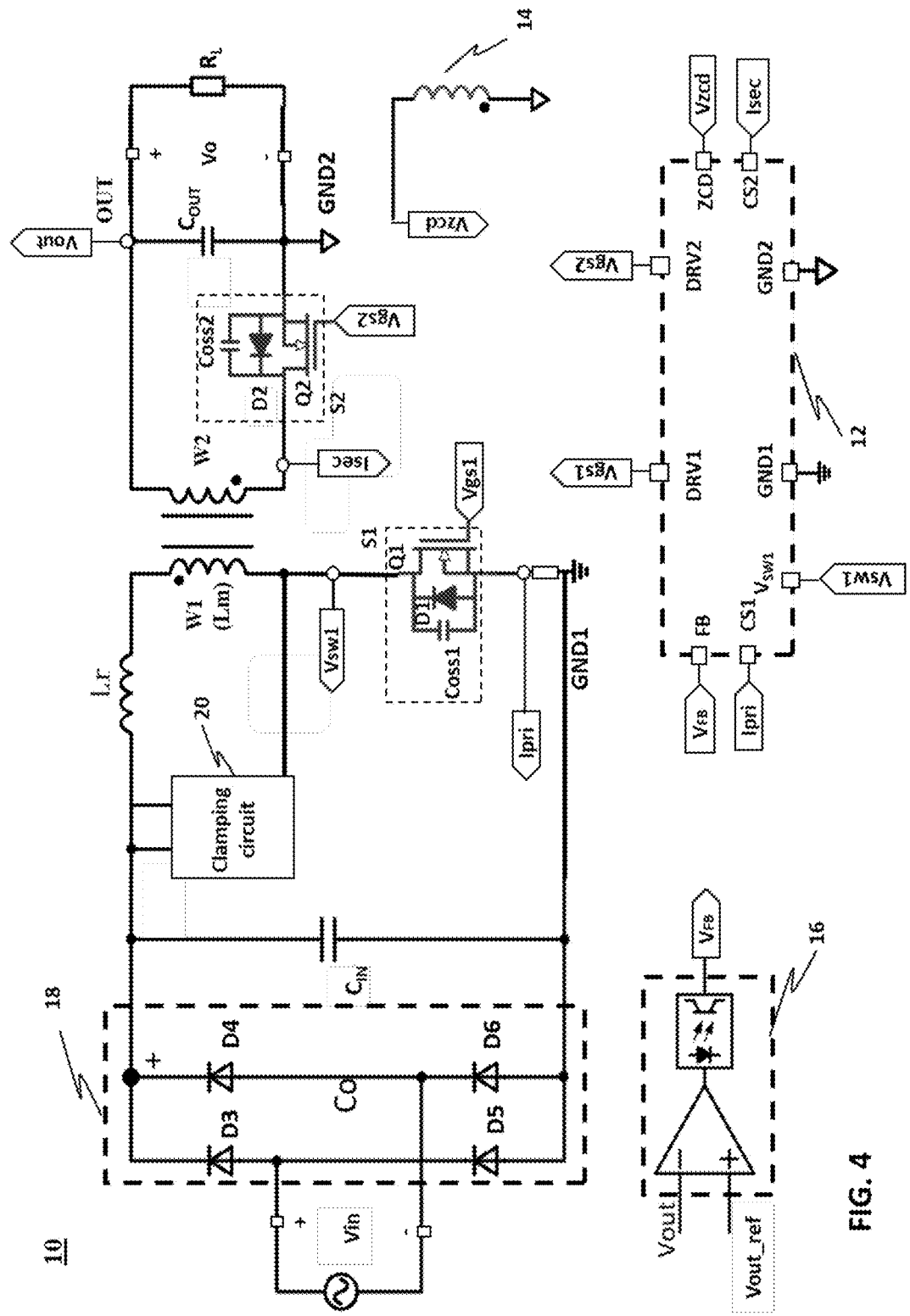
FIG. 4 depicts a schematic circuit diagram of a flyback converter according to some embodiments of the subject application.

FIG. 4 depicts a schematic circuit diagram of a flyback converter 10 according to some embodiments of the subject application. Referring to FIG. 4. The flyback convertor 100 may comprise a transformer having a primary winding W1 and a secondary winding W2; a primary switch S1 connected between the primary winding W1 and a primary ground node GND1; a secondary switch S2 coupled between the secondary winding W2 and a secondary ground node GND2; a controller 12 for controlling the on and off operations of the primary switch S1 and the secondary switch S2; an auxiliary winding 14; and a feedback loop circuit 16.

The auxiliary winding 14 may be magnetically coupled to the primary winding and secondary winding. The auxiliary winding 14 may be electrically connected from a zero-crossing detection (ZCD) node of the controller 12 to a signal ground. The auxiliary winding 14 is configured to generate a ZCD signal (Vzcd) which is indicative of the voltage provided by the secondary winding which is further indicative of the difference between the output voltage Vout and the drain-to-source voltage Vds2 of the secondary switch S2. In some embodiments, the ZCD signal may be proportional to the drain-to-source voltage Vds2 of the secondary switch S2.

The feedback loop circuit 16 may be configured for comparing the output voltage Vout against a reference voltage Vout_ref. Preferably, the reference voltage Vout_refmay be in a range between 1V and 10V. More specifically, the reference voltage Vout_refmay be 5V.

An input voltage Vin may be applied across the primary winding W1 and the primary switch S1 between an input node IN and the primary ground node. In some embodiments, an input decoupling capacitor Cin may be coupled to the input node IN.

In some embodiments, a rectifying circuit 18 may be provided and coupled between the input voltage Vin and the input decoupling capacitor Cin. The rectifying circuit may be a full wave rectifier having four diodes D3-D6 in a bridge configuration.

An output capacitor Cout may be coupled across the secondary winding W2 and the secondary switch S2 between an output node OUT and the secondary ground node GND2. An output voltage Vout may be generated at the output node OUT to drive a load $R_L$.

The primary switch S1 may be constructed with a transistor Q1. The secondary switch S2 may be constructed with a transistor Q2. Both transistors Q1 and Q2 may be NMOS transistors, PMOS transistor or HEMT (High electron mobility transistor). Each of the transistors Q1 and Q2 may have a drain, a source and a gate.

The transistors Q1 and Q2 may be formed of or include a direct bandgap material, such as an III-V compound, which includes, but not limited to, for example, GaAs, InP, GaN, InGaAs and AlGaAs.

The transistor Q1 has an equivalent capacitance Coss1 across its drain and source. The transistor Q1 has an equivalent body diode D1 across its drain and source. The transistor Q2 has an equivalent capacitance Coss2 across its drain and source. The transistor Q2 has an equivalent body diode D2 across its drain and source.

Referring to FIG. 4. The drain of the transistor Q1 may be coupled to the primary winding of the transformer. The source of the primary switch S1 coupled to the primary ground node. The drain of the transistor Q2 may be coupled to the secondary winding of the transformer. The source of the secondary switch S2 may be coupled to the secondary ground node.

The controller 12 may be configured to turn the primary switch and the secondary switch on and off alternately such that the primary switch S1 and the secondary switch S2 are complementary in operation with one switch being turned on while the other switch is turned off. Accordingly, the controller 12 may have a primary side controlling circuit and a secondary side controlling circuit communicable with each other.

In some embodiments, the controller 12 may have a DRV1 node coupled to the gate of the transistor Q1 and configured to generate a control signal Vgs1 to turn on and off the primary switch S1, a DRV2 node coupled to the gate of the gate of the transistor Q2 and configured to generate a control signal Vgs2 to turn on and off the secondary switch S2. The primary switch S1 may be controlled by the control voltage Vgs1 to conduct a primary current Ipri flowing in the primary transformer winding. The secondary switch S2 may be controlled by the control voltage Vgs2 to conduct a secondary current Isec flowing in the secondary transformer winding.

The controller 12 may further have a FB node coupled to the feedback loop circuit for receiving a feedback voltage VFB from a feedback loop circuit 16; a CS1 node coupled to the primary winding for detecting a primary current Ipri flowing in the primary winding and a VS1 node coupled to drain terminal of the primary switch S1 for detecting a switching voltage Vsw1 which is indicative of the drain-to-source voltage Vds1 of the primary switch S1.

The controller 12 may further have a ZCD node for receiving the ZCD signal Vzcd from the auxiliary winding 14; and a CS2 node coupled to the secondary winding for detecting a secondary current Isec flowing in the secondary winding.

In one embodiment, the controller 12 may be implemented in a single IC chip. In another embodiment, the controller 12 may be split into a primary side controller and a secondary side controller implemented in separate IC chips for controlling the primary switch S1 and the secondary switch S2 respectively. The primary side controller and the secondary side controller are communicable with each other. The primary side controller may have a DRV1 node coupled to the gate of the transistor Q1 and configured to generate a control signal Vgs1 to turn on and off the primary switch S1; a FB node for receiving a feedback voltage VFB from a feedback loop circuit 16; and a CS1 node coupled to the primary winding for detecting a primary current Ipri flowing in the primary winding. The secondary side controller may have a DRV2 node coupled to the gate of the gate of the transistor Q2 and configured to generate a control signal Vgs2 to turn on and off the secondary switch S2; a ZCD node for receiving the ZCD signal Vzcd from the auxiliary winding 14; and a CS2 node coupled to the secondary winding for detecting a secondary current Isec flowing in the secondary winding.

In some embodiments, a clamping circuit 20 may be provided to clamp the voltage at the drain of the primary switch S1 when the primary switch S1 is turned off.

Figure 5:
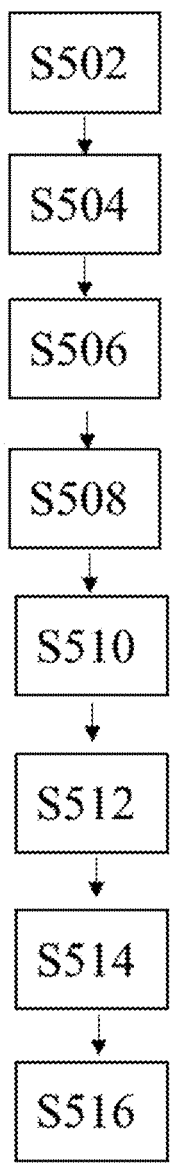
FIG. 5 is a flowchart of a zero-voltage switching timing control method for operating the flyback converter of FIG. 4 according to some embodiments of the subject application.

FIG. 5 is a flowchart of a zero-voltage switching timing control method for operating the flyback converter 10 of FIG. 4 according to some embodiments of the subject application. Referring to FIG. 5, the method may comprise the following steps:

S502: Turning on the primary switch by the controller 12 to start a power cycle and conduct a primary current Ipri in the primary winding when the switching voltage Vsw1 reaches a value less than the reference voltage value.

S504: Turning off the primary switch by the controller 12 when the primary current Ipri reaches a value greater than a reference current value Ipeak;

S506: Turning on, for a first time within the power cycle, the secondary switch by the controller 12 to conduct a secondary current Isec in the secondary winding following the primary switch being turned off for a non-overlapping delay;

S508: turning off, for the first time within the power cycle, the secondary switch by the controller 12 when the secondary current Isec reaches a zero-value;

S510: receiving the ZCD signal Vzcd from the auxiliary winding 14 via a ZCD node by the controller 12;

S512: turning on, for a second time within the power cycle, the secondary switch by the controller 12 in response to a rising edge of the signal Vzcd occurring immediately after an event count reaches a corresponding count threshold.

S514: turning off, for the second time within the power cycle, the secondary switch by the controller 12 after the secondary switch being turned on for a second-on time interval $t_{ON2}$; and S516: turning on the primary switch by the controller 12 to initiate a next power cycle following the secondary switch being turned off for the second time within the power cycle for a second-off time interval $t_{OFF2}$.

Preferably, the event count may be obtained by counting number of valleys occurring in the signal Vzcd and the corresponding count threshold is determined based on a load coupled to the flyback converter. Alternatively, the event count may be obtained by counting number of peaks occurring in the signal Vzcd and the corresponding count threshold is determined based on a load coupled to the flyback converter. In some embodiments, the load is determined based on the feedback voltage VFB indicative of the output voltage.

Preferably, the second-on time interval $t_{ON2}$ may be given by:

$$t_{ON2} = \sqrt{L_m C_{oss1}} \frac{V_{in} + nV_o}{nV_o} = \frac{\tau_{res}}{2\pi} \frac{V_{in} + nV_o}{nV_o},$$

where $L_m$ is the inductance of the primary winding, $C_{oss1}$ is the equivalent capacitance between the drain and source of the primary switch S1, $\tau_{res}$ is the resonance time constant of ringing between $L_m$ and $C_{oss1}$, $V_{in}$ is the input voltage, $V_o$ is the output voltage, n is the ratio of number of turns of the primary winding to number of turns of the secondary winding.

Preferably, the second-off time interval $t_{OFF2}$ may be given by:

$$t_{OFF2} = 2\sqrt{L_m C_{oss1}} = \frac{\tau_{res}}{\pi},$$

where $t_{OFF2}$ is the second-off time interval, $L_m$ is the inductance of the primary winding, $C_{oss1}$ is the equivalent capacitance between the drain and the source of the primary switch S1 and $\tau_{res}$ is the resonance time constant of ringing between $L_m$ and $C_{oss1}$.

Figure 6:
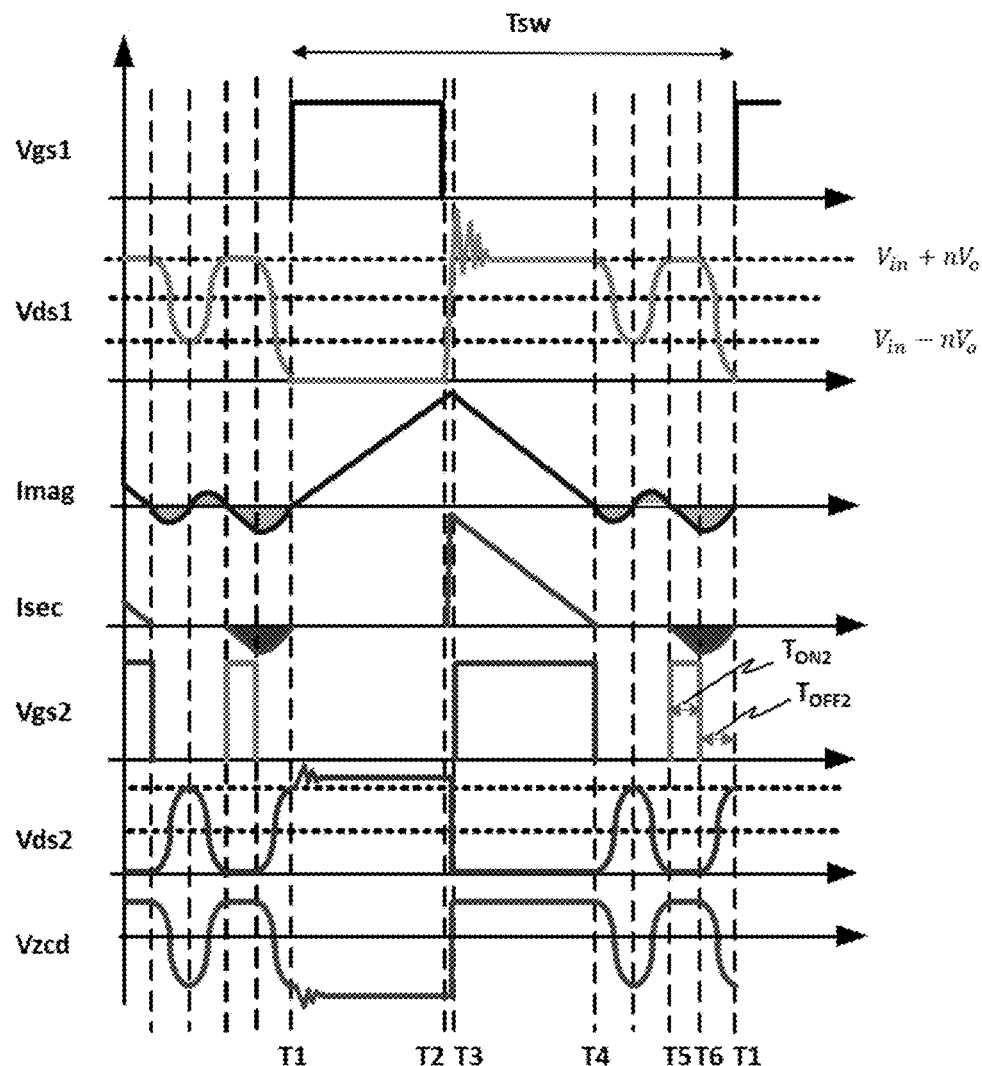
FIG. 6 depicts signal waveforms of operation based on the zero-voltage switching timing control method of FIG. 5 according to some embodiments of the subject application.

FIG. 6 depicts signal waveforms of operation based on the zero-voltage switching timing control method of FIG. 5 according to some embodiments of the subject application.

Referring to FIG. 6. At the start of a switching cycle Tsw, the primary switch S1 is turned on at T1. When the primary switch is turned on, the primary winding of the transformer is connected to the input voltage VIN and the primary current Ipri increases linearly as the magnetic flux in the transformer increases. At this time, the voltage induced in the secondary winding has a reverse polarity relative to the primary winding to cause the body diode D2 of the secondary switch S1 to be reversed biased. No secondary current Isec flows and the drain-to-source Vds2 of the secondary switch S2 is driven to a positive voltage. The signal Vzcd is driven to a negative voltage.

In some embodiments, the controller 12 may be configured to turn on the primary switch S1 to start the switching cycle when the switching voltage Vsw1 reaches a value less than a reference voltage value.

Figure 7:
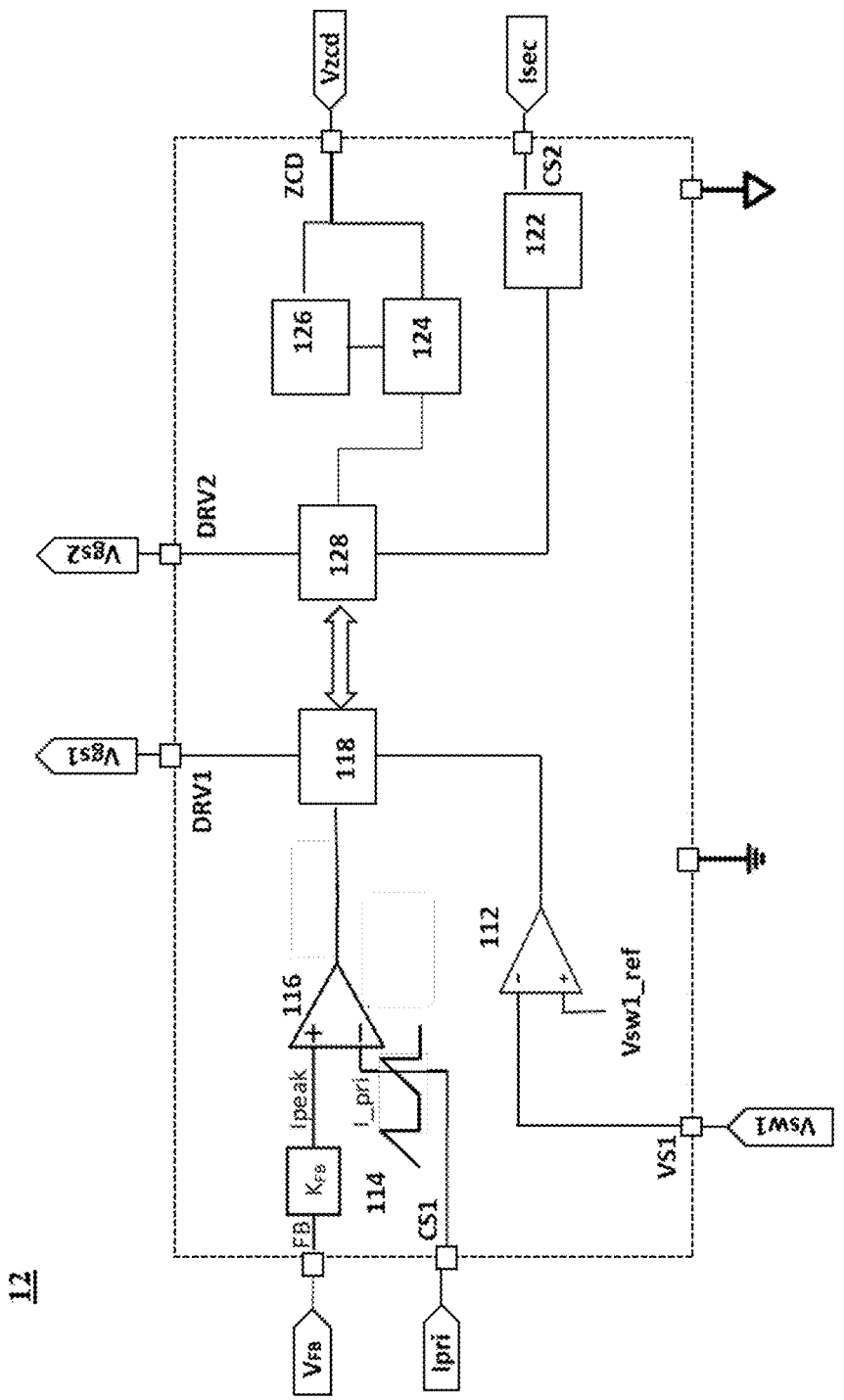
FIG. 7 depicts a functional block diagram of a controller implemented in the flyback converter of FIG. 4 according to some embodiments of the subject application.

FIG. 7 depicts a functional block diagram of the controller 12 implemented in the flyback converter 10 of FIG. 4 according to alternate embodiments of the subject application.

Accordingly, referring to FIG. 7, the controller 12 may comprise a comparator 112 having a first input coupled to the VS1 node for detecting the switching voltage Vsw1, a second input coupled to a reference voltage level Vsw1_ref. The comparator 112 may be configured to compare the voltage Vsw1 against the reference voltage level Vsw1_ref and generate an output signal Vcomp3 indicative of the compared result. If Vsw1 is lower than Vsw1_ref, the output signal Vcomp3 will have a high voltage level. The output signal Vcomp3 is then fed to a driving circuit 118 for generating the control signal Vgs1 to turn on the primary switch S1.

Referring back to FIG. 6. The primary switch S1 is turned off at T2. When the primary switch is turned off, the magnetization current Imag decreases and the magnetic flux drops. The voltage across the secondary winding reverses. This causes the body diode D2 of the secondary switch S2 to be become forward biased.

In some embodiments, the controller 12 may be configured to turn off the primary switch S1 when the primary current Ipri reaches a value greater than a reference current value Ipeak.

Accordingly, referring to FIG. 7, the controller 12 may further comprise a divider 114 and a comparator 116. The divider 114 may be coupled to the input node FB and configured to divide the feedback voltage VFB by a factor of K (e.g. 4) to set a peak current threshold Ipeak. The comparator 116 may has a first input coupled to the input node CS1 for receiving the primary current Ipri, a second input coupled to the divider for receiving the peak current threshold Ipeak. The comparator 116 may be configured to compare the primary current Ipri to the peak current threshold Ipeak and generate an output signal Vcomp2 indicative of the compared result. If Ipri is higher than Ipeak, the output signal Vcomp2 will have a low voltage level. The output signal Vcomp2 is then fed to a driving circuit 118 generating the driving signal Vgs1.

Referring back to FIG. 6. The secondary switch is turned on at T3. When the secondary switch is turned on, the drain-to-source voltage Vds2 of the secondary switch S2 reaches zero volts. The signal Vzcd is driven to a positive voltage. As the secondary current Isec is conducted, the stored energy in the transformer core is transferred to the output capacitor $C_{OUT}$. Both the magnetization current Imag and the secondary current Isec decreases.

In some embodiments, the controller 12 may be configured to turn on the secondary switch after the primary switch being turned off for a non-overlapping delay. The non-overlapping delay may be a pre-defined value in the range of tens to hundreds of nanoseconds. Alternatively, the controller 12 may be configured to turn on the secondary switch when the source-to-drain voltage Vds2 of the secondary switch S2 is greater than zero or a threshold value slightly greater than zero, such as 0.3 to 0.5 volts.

Accordingly, referring back to FIG. 7. The controller 12 may further comprise a current comparator 122 for detecting whether the secondary current Isec is greater than zero and generate an output signal Vcomp4 to a driving circuit 128 for generating the control signal Vgs2.

Referring back to FIG. 6. The secondary switch is turned off at T4. During the period in which both the primary switch S1 and the secondary switch S2 are turned off, the drain-to-source voltage Vds1 of the primary switch S1 fluctuates between $V_{in}+nV_o$ and $V_{in}-nV_o$, where $V_{in}$ is the input voltage, $V_o$ is the output voltage, n is the ratio of number of turns of the primary winding to number of turns of the secondary winding. The drain-to-source voltage Vds2 of the secondary switch S2 and the signal Vzcd also fluctuate.

In some embodiments, the controller 12 may be configured to turn off the secondary switch by the controller 12 when the secondary current reaches a zero-value after the secondary switch is turned on. Accordingly, referring back to FIG. 7, the comparator 122 may be configured to detect whether the secondary current Isec is reaches a zero-value after the secondary switch is turned on and generate an output signal Vcomp4 to a driving circuit 128 for generating the driving signal Vgs2.

Referring back to FIG. 6. The secondary switch is turned on again at T5. To accomplish zero voltage switching, When the secondary switch is turned on again for a second-on time interval $T_{ON2}$, a negative current ripple is induced in the secondary current such that resonance energy is built up in the transformer over the second-on time interval $T_{ON2}$ and used to drive down the drain-to-source voltage Vds1 on the primary switch before the primary switch is turned on to start another switching cycle. The built-up resonance energy in the transformer is transferred to the primary winding which causes a negative current to flow in the primary switch to discharge the total capacitance at the primary switch, thereby bringing the drain-to-source voltage to zero volts.

In some embodiments, the controller 12 may be configured to turn on the secondary switch for the second time in response to a rising edge of the signal Vzcd occurring immediately after an event count reaches a corresponding count threshold.

In one embodiment, the event count may be obtained by counting number of valleys occurring in the signal Vzcd and the corresponding count threshold is determined based on a load coupled to the flyback converter.

Accordingly, referring to FIG. 7, the controller 12 may further comprise a rising edge detection circuit 124 configured to detect rising edges occurring on the signal Vzcd; and a counter circuit 126 configured to count number of valleys occurring in the signal Vzcd.

In another embodiment, the event count may be obtained by counting number of peaks occurring in the signal Vzcd and the corresponding count threshold is determined based on a load coupled to the flyback converter. Accordingly, the counter 126 in FIG. 7 may be configured to count number of peaks occurring in the signal Vzcd.

Referring back to FIG. 6. the secondary switch is turned off at T6 before the next switching cycle is initiated. In some embodiments, the controller 12 may be configured to turn on the primary switch to initiate a next power cycle after the secondary switch being turned off for the second time for a second-off time interval $t_{OFF2}$.

Figure 8:
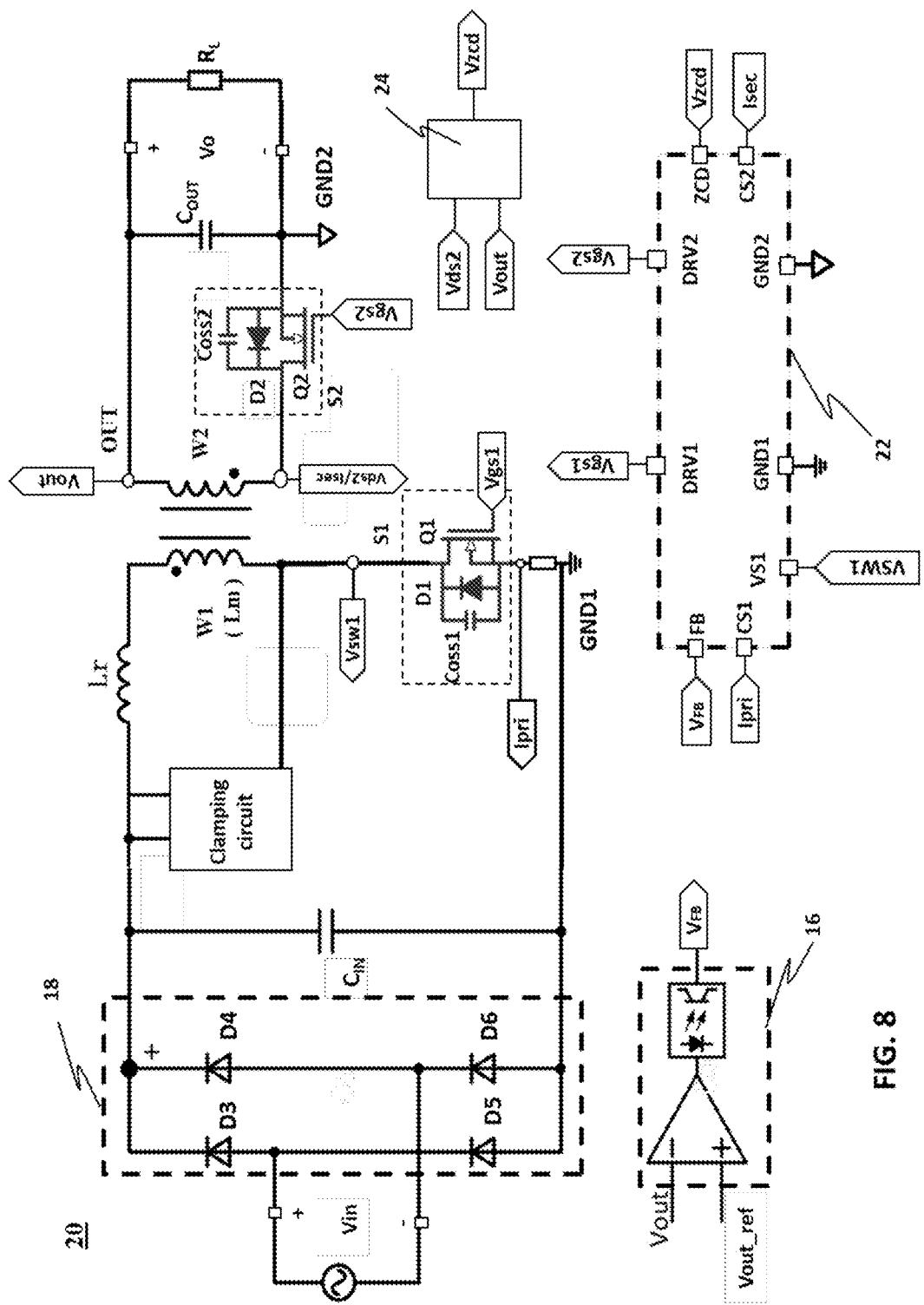
FIG. 8 is schematic diagram of a flyback converter according to alternate embodiments of the subject application.

FIG. 8 is schematic diagram of a flyback converter 20 according to alternate embodiments of the subject application. The flyback converter 20 in FIG. 8 is constructed in the same manner as the flyback converter 10 of FIG. 4 except for the signal Vzcd is obtained based on the source-to-drain voltage Vds2 of the secondary switch and the output voltage Vout. Identical elements in FIGS. 4 and 8 are given the same reference numerals and will not be further described in details.

Referring to FIG. 8. The flyback convert 20 may comprise a transformer having a primary winding W1 and a secondary winding W2; a primary switch S1 connected between the primary winding W1 and a primary ground node GND1; a secondary switch S2 coupled between the secondary winding W2 and a secondary ground node GND2; a controller 22 for controlling the on and off operations of the primary switch S1 and the secondary switch S2; a zero-crossing detection (ZCD) circuit 24; and a feedback loop circuit 16.

The ZCD circuit 24 may have a first input coupled to a first end of the secondary winding (at the drain of the secondary switch) for detecting the drain-to-source voltage Vds2 of the secondary switch, a second input coupled to a second end of secondary winding (at the output node OUT) for detecting the output voltage Vout, and an output coupled to a ZCD node of the controller 22. The ZCD circuit 24 may be configured to generate a ZCD signal (Vzcd) based on the drain-to-source voltage Vds2 and the output voltage Vout. Preferably, the signal Vzcd is indicative of difference between the source-to-drain voltage Vds2 of the secondary switch and the output voltage Vout.

Similarly, the controller 22 may have a DRV1 node coupled to the gate of the transistor Q1 and configured to generate a control signal Vgs1 to turn on and off the primary switch S1, a DRV2 node coupled to the gate of the gate of the transistor Q2 and configured to generate a control signal Vgs2 to turn on and off the secondary switch S2. The primary switch S1 may be controlled by the control voltage Vgs1 to conduct a primary current Ipri flowing in the primary transformer winding. The secondary switch S2 may be controlled by the control voltage Vgs2 to synchronize conduction of a secondary current Isec flowing in the secondary transformer winding.

The controller 22 may further have a FB node coupled to the feedback loop circuit for receiving a feedback voltage VFB from a feedback loop circuit 16; a CS1 node coupled to the primary winding for detecting a primary current Ipri flowing in the primary winding and a VS1 node coupled to drain terminal of the primary switch S1 for detecting a switching voltage Vsw1 which is indicative of the drain-to-source voltage Vds1 of the primary switch S1.

The controller 22 may further have a ZCD node for receiving the ZCD signal Vzcd from the ZCD circuit 24; and a CS2 node coupled to the secondary winding for detecting a secondary current Isec flowing in the secondary winding.

In the present embodiment, the ZCD circuit is separated from the controller circuit such that the controller has only one ZCD node. In another embodiment, the ZCD circuit may be integrated in the controller circuit and the controller may have a ZCD1 node and a ZCD2 node for detecting the drain-to-source voltage Vds2 of the secondary switch and the output voltage Vout respectively.

Figure 9:
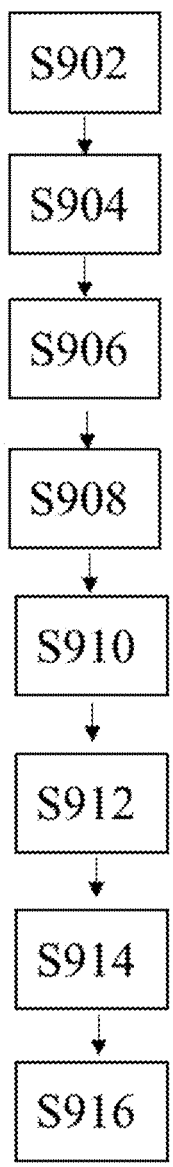
FIG. 9 is a flowchart of a zero-voltage switching timing control method for operating the flyback converter of FIG. 8 according to alternate embodiments of the subject application.

FIG. 9 is a flowchart of a zero-voltage switching timing control method for operating the flyback converter 20 of FIG. 8 according to some embodiments of the subject application. Referring to FIG. 9, the method may comprise the following steps:

S902: Turning on the primary switch by a controller 22 to start a power cycle and conduct a primary current Ipri in the primary winding when the switching voltage Vsw1 reaches a value less than a reference voltage value.

S904: Turning off the primary switch by the controller 22 when the primary current Ipri reaches a value greater than a reference current value Ipeak;

S906: Turning on, for a first time within the power cycle, the secondary switch by the controller 22 to conduct a secondary current Isec in the secondary winding following the primary switch being turned off for a non-overlapping delay;

S908: Turning off, for the first time within the power cycle, the secondary switch by the controller 22 when the secondary current Isec reaches a zero-value;

S910: Receiving the ZCD signal Vzcd from the ZCD circuit 24 via a ZCD node by the controller 22;

S912: turning on, for a second time within the power cycle, the secondary switch by the controller 22 in response to a falling edge of the signal Vzcd occurring immediately after an event count reaches a corresponding count threshold.

S914: turning off, for the second time within the power cycle, the secondary switch by the controller 22 after the secondary switch being turned on for a second-on time interval $t_{ON2}$; and S916: turning on the primary switch by the controller 22 to initiate a next power cycle following the secondary switch being turned off for the second time within the power cycle for a second-off time interval $t_{OFF2}$.

As described above, the reference current value may preferably be set by a feedback loop circuit configured to compare the output voltage to a reference voltage and generate a feedback signal to the controller 22 via a feedback node.

As described above, the event count may be preferably obtained by counting number of valleys or peaks occurring in the signal Vzcd and the corresponding count threshold is determined based on a load coupled to the flyback converter. In some embodiments, the load is determined based on the feedback voltage VFB indicative of the output voltage.

As described above, the second-on time interval $t_{ON2}$ may preferably be given by:

$$t_{ON2} = \sqrt{L_m C_{oss1}}\, \frac{V_{in} + nV_o}{nV_o} = \frac{\tau_{res}}{2\pi} \frac{V_{in} + nV_o}{nV_o},$$

where $L_m$ is the inductance of the primary winding, $C_{oss1}$ is the equivalent capacitance between the drain and source of the primary switch S1, $\tau_{res}$ is the resonance time constant of ringing between $L_m$ and $C_{oss1}$, $V_{in}$ is the input voltage, $V_o$ is the output voltage, n is the ratio of number of turns of the primary winding to number of turns of the secondary winding.

As described above, the second-off time interval $t_{OFF2}$ may preferably be given by:

$$t_{OFF2} = 2\sqrt{L_m C_{oss1}} = \frac{\tau_{res}}{\pi},$$

where $t_{OFF2}$ is the second-off time interval, $L_m$ is the inductance of the primary winding, $C_{oss1}$ is the equivalent capacitance between the drain and the source of the primary switch S1 and $\tau_{res}$ is the resonance time constant of ringing between $L_m$ and $C_{oss1}$.

Figure 10:
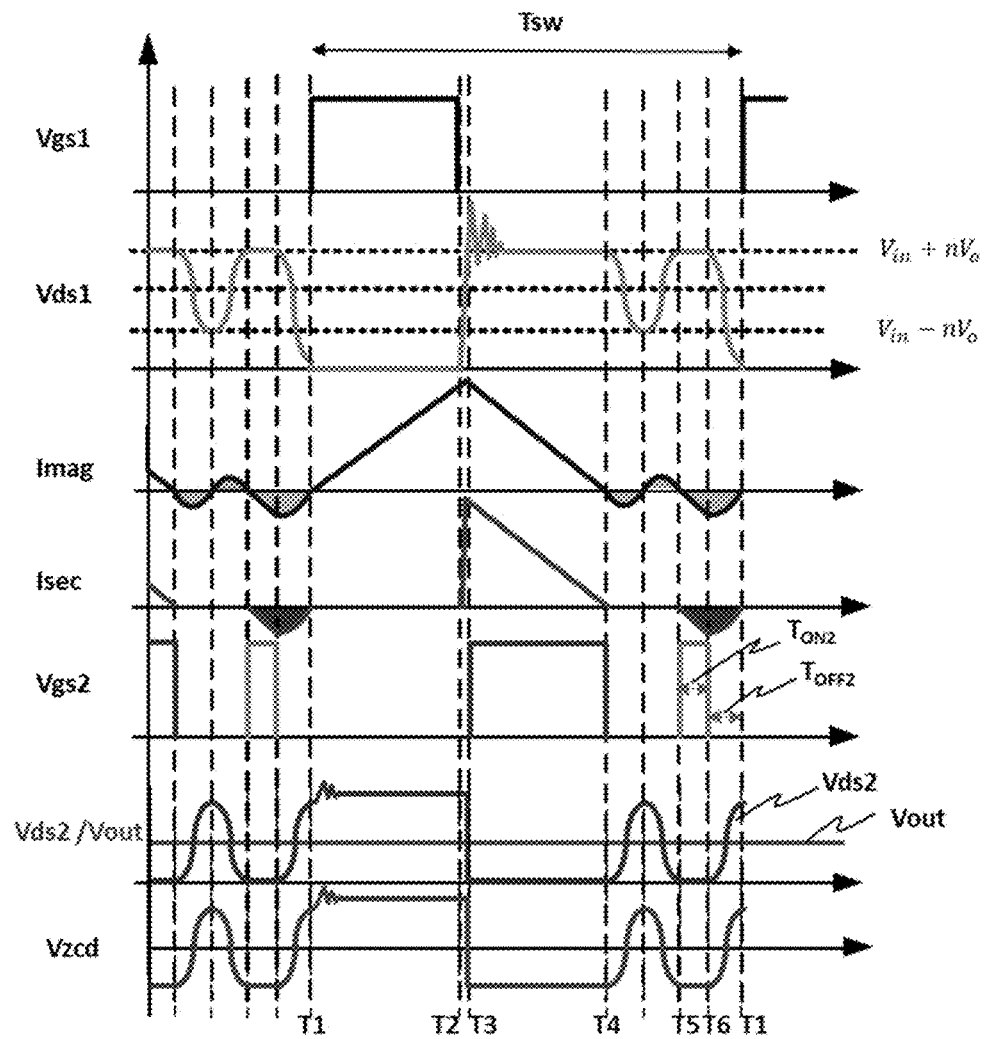
FIG. 10 depicts signal waveforms of operation based on the zero-voltage switching timing control method of FIG. 9 according to alternate embodiments of the subject application.

FIG. 10 depicts signal waveforms of operation based on the zero-voltage switching timing control method of FIG. 9 according to alternate embodiments of the subject application.

Referring to FIG. 10. At the start of a switching cycle Tsw, the primary switch S1 is turned on at T1. When the primary switch is turned on, the primary winding of the transformer is connected to the input voltage VIN and the primary current Ipri increases linearly as the magnetic flux in the transformer increases. At this time, the voltage induced in the secondary winding has a reverse polarity relative to the primary winding to cause the body diode D2 of the secondary switch S1 to be reversed biased. No secondary current Isec flows. The drain-to-source Vds2 of the secondary switch S2 is driven to a positive voltage. The signal Vzcd is also driven to a positive voltage.

In some embodiments, the controller 22 may be configured to turn on the primary switch S1 to start the switching cycle when the switching voltage Vsw1 reaches a value less than a reference voltage value.

Figure 11:
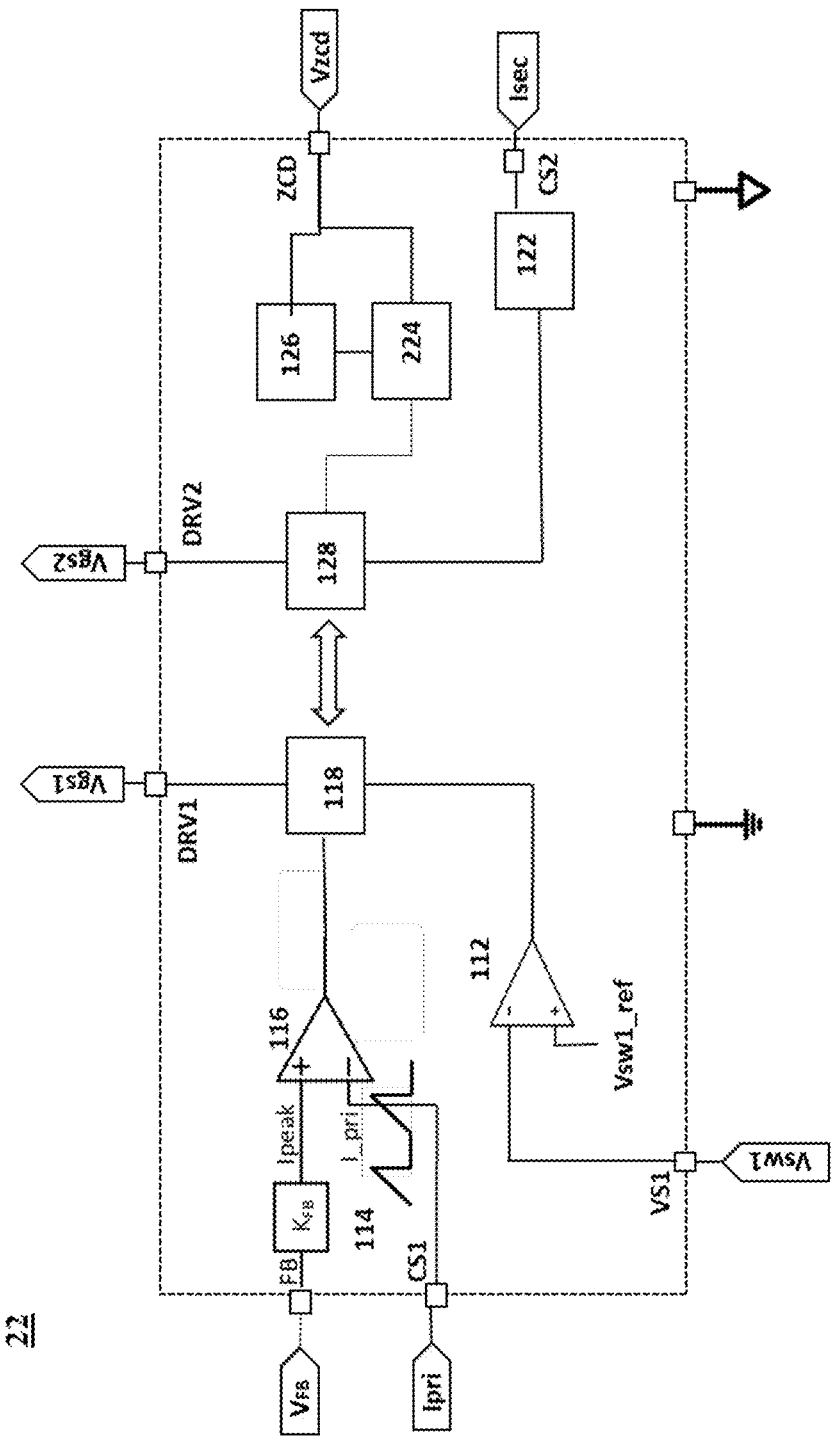
FIG. 11 depicts a functional block diagram of a controller implemented in the flyback converter of FIG. 8 according to alternate embodiments of the subject application.

FIG. 11 depicts a functional block diagram of the controller 22 implemented in the flyback converter 20 of FIG. 8 according to alternate embodiments of the subject application.

Accordingly, referring to FIG. 11, the controller 22 may comprise a comparator 112 having a first input coupled to the VS1 node for detecting the switching voltage Vsw1, a second input coupled to a reference voltage level Vsw1_ref. The comparator 112 may be configured to compare the voltage Vsw1 against the reference voltage level Vsw1_ref and generate an output signal Vcomp3 indicative of the compared result. If Vsw1 is lower than Vsw1_ref, the output signal Vcomp3 will have a high voltage level. The output signal Vcomp3 is then fed to a driving circuit 118 for generating the control signal Vgs1 to turn on the primary switch S1.

Referring back to FIG. 10. The primary switch S1 is turned off at T2. When the primary switch is turned off, the magnetization current Imag decreases and the magnetic flux drops. The voltage across the secondary winding reverses. This causes the body diode D2 of the secondary switch S2 to be become forward biased.

In some embodiments, the controller 22 may be configured to turn off the primary switch S1 when the primary current Ipri reaches a value greater than a reference current value Ipeak.

Accordingly, referring to FIG. 11, the controller 22 may further comprise a divider 114 and a comparator 116. The divider 114 may be coupled to the input node FB and configured to divide the feedback voltage VFB by a factor of K (e.g. 4) to set a peak current threshold Ipeak. The comparator 116 may has a first input coupled to the input node CS1 for receiving the primary current Ipri, a second input coupled to the divider for receiving the peak current threshold Ipeak. The comparator 116 may be configured to compare the primary current Ipri to the peak current threshold Ipeak and generate an output signal Vcomp2 indicative of the compared result. If Ipri is higher than Ipeak, the output signal Vcomp2 will have a high voltage level; if the Ipri is lower than Ipeak, the output signal Vcomp2 will have a low voltage level. The output signal Vcomp2 is then fed to a driving circuit 118 generating the driving signal Vgs1.

Referring back to FIG. 10. The secondary switch is turned on at T3. When the secondary switch is turned on, the drain-to-source voltage Vds2 of the secondary switch S2 reaches zero volts. The signal Vzcd is driven to a negative voltage. As the secondary current Isec is conducted, the stored energy in the transformer core is transferred to the output capacitor $C_{OUT}$. Both the magnetization current Imag and the secondary current Isec decreases.

In some embodiments, the controller 22 may be configured to turn on the secondary switch after the primary switch being turned off for a non-overlapping delay. The non-overlapping delay may be a pre-defined value in the range of tens to hundreds of nanoseconds. Alternatively, the controller 22 may be configured to turn on the secondary switch when the source-to-drain voltage Vds2 of the secondary switch S2 is greater than zero or a threshold value slightly greater than zero, such as 0.3 to 0.5 volts.

Accordingly, referring back to FIG. 11. The controller 22 may further comprise a current comparator 122 for detecting whether the secondary current Isec is greater than zero and generate an output signal Vcomp4 to a driving circuit 128 for generating the control signal Vgs2.

Referring back to FIG. 10. The secondary switch is turned off at T4. During the period in which both the primary switch S1 and the secondary switch S2 are turned off, the drain-to-source voltage Vds1 of the primary switch S1 fluctuates between $V_{in}+nV_o$ and $V_{in}-nV_o$, where $V_{in}$ is the input voltage, $V_o$ is the output voltage, n is the ratio of number of turns of the primary winding to number of turns of the secondary winding. The drain-to-source voltage Vds2 of the secondary switch S2 and the signal Vzcd also fluctuate.

In some embodiments, the controller 22 may be configured to turn off the secondary switch by the controller 22 when the secondary current reaches a zero-value after the secondary switch is turned on. Accordingly, referring back to FIG. 11, the comparator 122 may be configured to detect whether the secondary current Isec is reaches a zero-value after the secondary switch is turned on and generate an output signal Vcomp4 to a driving circuit 128 for generating the control signal Vgs2.

Referring back to FIG. 10. The secondary switch is turned on again at T5. To accomplish zero voltage switching, When the secondary switch is turned on again for a second-on time interval $t_{ON2}$ a negative current ripple is induced in the secondary current such that resonance energy is built up in the transformer over the second-on time interval $t_{ON2}$ and used to drive down the drain-to-source voltage Vds1 on the primary switch before the primary switch is turned on to start another switching cycle. The built-up resonance energy in the transformer is transferred to the primary winding which causes a negative current to flow in the primary switch to discharge the total capacitance at the primary switch, thereby bringing the drain-to-source voltage to zero volts.

In some embodiments, the controller 22 may be configured to turn on the secondary switch for the second time in response to a falling edge of the signal Vzcd occurring immediately after an event count reaches a corresponding count threshold.

In one embodiment, the event count may be obtained by counting number of valleys occurring in the signal Vzcd and the corresponding count threshold is determined based on a load coupled to the flyback converter.

Accordingly, referring to FIG. 11, the controller 22 may further comprise a falling edge detection circuit 224 configured to detect falling edges occurring on the signal Vzcd; and a counter circuit 126 configured to count number of valleys occurring in the signal Vzcd.

In another embodiment, the event count may be obtained by counting number of peaks occurring in the signal Vzcd and the corresponding count threshold is determined based on a load coupled to the flyback converter. Accordingly, the counter 126 in FIG. 11 may be configured to count number of peaks occurring in the signal Vzcd.

Referring back to FIG. 10. the secondary switch is turned off at T6 before the next switching cycle is initiated. In some embodiments, the controller 22 may be configured to turn on the the primary switch to initiate a next power cycle after the secondary switch being turned off for the second time for a second-off time interval $t_{OFF2}$.

As used herein, the singular terms "a," "an," and "the" may include plural referents unless the context clearly dictates otherwise.

The foregoing description of the subject application has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

The invention claimed is:

1. A flyback converter comprising:
   a transformer having a primary winding receiving an input voltage and a secondary winding providing an output voltage;
   a primary switch coupled to the primary winding, having a source terminal, a drain terminal and a gate terminal;
   a secondary switch coupled to the secondary winding, having a source terminal, a drain terminal and a gate terminal;
   a zero-crossing detection (ZCD) circuit having a first input connected to a first end of the secondary winding for detecting a drain-to-source voltage of the secondary switch, a second input connected to a second end of the secondary winding for detecting the output voltage, the ZCD circuit is configured to generate a ZCD signal based on the drain-to-source voltage of the secondary switch and the output voltage;
   a controller configured to obtain the ZCD signal from the ZCD circuit via a ZCD node and generate control signals to turn the primary switch and the secondary switch on and off alternately such that:
   the primary switch is turned on to conduct a primary current in the primary winding to start a power cycle when a voltage across the drain terminal and the source terminal of the primary switch reaches a value less than a reference voltage value;
   the primary switch is turned off when the primary current reaches a value greater than a reference current value;
   the secondary switch is turned on, for a first time within the power cycle, to conduct a secondary current in the secondary winding after the primary switch being turned off for a non-overlapping delay;
   the secondary switch is turned off, for the first time within the power cycle, when the secondary current reaches a zero-value;
   the secondary switch is turned on, for a second time within the power cycle, in response to a falling edge of the ZCD signal occurring immediately after an event count reaches a corresponding count threshold;
   the secondary switch is turned off, for the second time within the power cycle, following the secondary switch being turned on for a second-on time interval; and
   the primary switch is turned on to initiate a next power cycle following the secondary switch being turned off for the second time within the power cycle for a second-off time interval.

2. The flyback converter according to claim 1, wherein the reference voltage value is in a range from approximately 1V to approximately 10V.

3. The flyback converter according to claim 2, wherein the reference voltage value is approximately 5V.

4. The flyback converter according to claim 1, wherein the reference current value is set by a feedback loop circuit configured to compare the output voltage against a reference voltage and generate a feedback signal to the controller via a feedback node.

5. The flyback converter according to claim 1, wherein the event count is obtained by counting number of valleys occurring in the ZCD signal and the corresponding count threshold is determined based on a load coupled to the flyback converter.

6. The flyback converter according to claim 1, wherein the event count is obtained by counting number of peaks occurring in the ZCD signal and the corresponding count threshold is determined based on a load coupled to the flyback converter.

7. The flyback converter according to claim 1, wherein the second-on time interval is given by $$t_{ON2} = \sqrt{L_m C_{oss1}} \frac{V_{in} + nV_o}{nV_o} = \frac{\tau_{res}}{2\pi} \frac{V_{in} + nV_o}{nV_o},$$

where $t_{ON2}$ is the second-on time interval, $L_m$ is the inductance of the primary winding, $C_{oss1}$ is the equivalent capacitance between the drain terminal and the source terminal of the primary switch and $\tau_{res}$ is the resonance time constant of ringing between $L_m$ and $C_{oss1}$, $V_{in}$ is the input voltage, $V_o$ is the output voltage, n is the ratio of number of turns of the primary winding to number of turns of the secondary winding.

8. The flyback converter according to claim 1, wherein the second-off time interval is given by:

$$t_{OFF2} = 2\sqrt{L_m C_{oss1}} = \frac{\tau_{res}}{\pi},$$

where $t_{OFF2}$ is the second-on time interval, $L_m$ is the inductance of the primary winding, $C_{oss1}$ is the equivalent capacitance between the drain terminal and the source terminal of the primary switch and $\tau_{res}$ is the resonance time constant of ringing between $L_m$ and $C_{oss1}$.

9. A method of operating a flyback converter having a transformer comprising a primary winding receiving an input voltage and a secondary winding providing an output voltage, a primary switch being coupled to the primary winding and having a source terminal, a drain terminal and a gate terminal, and a secondary switch being coupled to the secondary winding and having a source terminal, a drain terminal and a gate terminal, the method comprising:

turning on the primary switch by a controller to start a power cycle and conduct a primary current in the primary winding when a switching voltage reaches a value less than a reference voltage value, wherein the switching voltage is indicative of a drain-to-source voltage of the primary switch;

turning off the primary switch by the controller when the primary current reaches a value greater than a reference current value;

turning on, for a first time within the power cycle, the secondary switch by the controller to conduct a secondary current in the secondary winding after the primary switch being turned off for a non-overlapping delay;

turning off, for the first time within the power cycle, the secondary switch by the controller when the secondary current reaches a zero-value;

receiving a zero-current detection (ZCD) signal from a ZCD circuit via a ZCD node, wherein the ZCD signal is generated by the ZCD circuit based on a drain-to-source voltage of the secondary switch and the output voltage;

turning on, for a second time within the power cycle, the secondary switch by the controller in response to a falling edge of the ZCD signal occurring immediately after an event count reaches a corresponding count threshold;

turning off, for the second time within the power cycle, the secondary switch by the controller after the secondary switch being turned on for a second-on time interval; and turning on the primary switch by the controller to initiate a next power cycle following the secondary switch being turned off for the second time within the power cycle for a second-off time interval.

10. The method according to claim 9, wherein the reference voltage value is in a range from approximately 1V to approximately 10V.

11. The method according to claim 10, wherein the reference voltage value is approximately 5 V.

12. The method according to claim 9, wherein the reference current value is set by a feedback loop circuit configured to compare the output voltage against a reference voltage and generate a feedback signal to the controller via a feedback node.

13. The method according to claim 9, wherein the event count is obtained by counting number of valleys occurring in the ZCD signal and the corresponding count threshold is determined based on a load coupled to the flyback converter.

14. The method according to claim 9, wherein the event count is obtained by counting number of peaks occurring in the ZCD signal and the corresponding count threshold is determined based on a load coupled to the flyback converter.

15. The method according to claim 9, wherein the second-on time interval is given by $$t_{ON2} = \sqrt{L_m C_{oss1}} \frac{V_{in} + nV_o}{nV_o} = \frac{\tau_{res}}{2\pi} \frac{V_{in} + nV_o}{nV_o},$$

where $t_{ON2}$ is the second-on time interval, $L_m$ is the inductance of the primary winding, $C_{oss1}$ is the equivalent capacitance between the drain terminal and the source terminal of the primary switch, $\tau_{res}$ is the resonance time constant of ringing between $L_m$ and $C_{oss1}$, $V_{in}$ is the input voltage, $V_o$ is the output voltage, n is the ratio of number of turns of the primary winding to number of turns of the secondary winding.

16. The method according to claim 9, wherein the second-off time interval is given by:

$$t_{OFF2} = 2\sqrt{L_m C_{oss1}} = \frac{\tau_{res}}{2\pi},$$

where $t_{OFF2}$ is the second-on time interval, $L_m$ is the inductance of the primary winding, $C_{oss1}$ is the equivalent capacitance between the drain terminal and the source terminal of the primary switch, and $\tau_{res}$ is the resonance time constant of ringing between $L_m$ and $C_{oss1}$.

* * * * *